(12) United States Patent
Zhu et al.

(10) Patent No.: US 10,002,410 B2
(45) Date of Patent: Jun. 19, 2018

(54) METHOD AND SYSTEM FOR ENHANCEMENT OF CELL ANALYSIS

(71) Applicant: KONICA MINOLTA LABORATORY U.S.A., INC., San Mateo, CA (US)

(72) Inventors: Jingwen Zhu, San Mateo, CA (US); Yongmian Zhang, San Mateo, CA (US); Foram Manish Paradkar, San Mateo, CA (US); Haisong Gu, San Mateo, CA (US)

(73) Assignee: KONICA MINOLTA LABORATORY U.S.A, INC., San Mateo, CA (US)

( * ) Notice: Subject to any disclaimer, the term of this patent is extended or adjusted under 35 U.S.C. 154(b) by 114 days.

(21) Appl. No.: 15/252,903

(22) Filed: Aug. 31, 2016

(65) Prior Publication Data

US 2017/0091907 A1    Mar. 30, 2017

Related U.S. Application Data

(60) Provisional application No. 62/235,157, filed on Sep. 30, 2015.

(51) Int. Cl.
*G06K 9/00* (2006.01)
*G06T 5/00* (2006.01)
(Continued)

(52) U.S. Cl.
CPC ............ *G06T 5/002* (2013.01); *G06K 9/0014* (2013.01); *G06T 5/00* (2013.01); *G06T 5/50* (2013.01);
(Continued)

(58) Field of Classification Search
CPC ... G06T 5/002; G06T 7/11; G06T 5/00; G06T 5/50; G06T 2207/20221; G06K 9/0014; G06K 9/00147
(Continued)

(56) References Cited

U.S. PATENT DOCUMENTS

| 7,376,266 B2 * | 5/2008 | Simard, III ........ G06K 9/00456 358/426.01 |
| 2010/0002929 A1 * | 1/2010 | Sammak ............ G06K 9/00127 382/133 |

(Continued)

OTHER PUBLICATIONS

Andrade, "An Interactive Algorithm for Image Smoothing and Segmentation", Electronic Letters on Computer Vision and Image Analysis 4(1):32-48, 2004.

*Primary Examiner* — Van D Huynh
(74) *Attorney, Agent, or Firm* — Buchanan Ingersoll & Rooney PC

(57) ABSTRACT

A method, computer readable medium, and system are disclosed of enhancing cell images for analysis. The method includes performing a multi-thresholding process on a cell image to generate a plurality of images of the cell image; smoothing each component within each of the plurality of images; merging the smoothed components into a merger layer; classifying each of the components of the merged layer into convex cell regions and concave cell regions; combining the concave cell regions with a cell boundary for each of the corresponding concave cell regions to generate a smoothed shape profile for each of the concave cell regions; and generating an output image by combining the convex cell regions with the concave cell regions with smoothed shape profiles.

19 Claims, 8 Drawing Sheets

(51) Int. Cl.
*G06T 5/50* (2006.01)
*G06T 7/11* (2017.01)
(52) U.S. Cl.
CPC ...... *G06T 7/11* (2017.01); *G06T 2207/10064* (2013.01); *G06T 2207/20081* (2013.01); *G06T 2207/20182* (2013.01); *G06T 2207/20221* (2013.01); *G06T 2207/30024* (2013.01)
(58) Field of Classification Search
USPC .......................................................... 382/133
See application file for complete search history.

(56) References Cited

U.S. PATENT DOCUMENTS

| | | | | |
|---|---|---|---|---|
| 2013/0270436 | A1* | 10/2013 | Namai | H01J 37/28 250/307 |
| 2014/0247972 | A1* | 9/2014 | Wang | G06K 9/6227 382/133 |
| 2015/0078648 | A1* | 3/2015 | Lee | G06K 9/0014 382/133 |
| 2016/0171688 | A1* | 6/2016 | Farsiu | A61B 5/0066 382/131 |

* cited by examiner

# METHOD AND SYSTEM FOR ENHANCEMENT OF CELL ANALYSIS

CROSS-REFERENCES TO RELATED APPLICATIONS

This application claims priority to U.S. Provisional Patent Application Ser. No. 62/235,157, filed on Sep. 30, 2015, the entire content of which is incorporated herein by reference.

FIELD OF THE INVENTION

The present disclosure relates to a method and system for enhancement of cell analysis, and more particularly, to a method and system for extracting cell body regions, for example, from pathological images.

BACKGROUND OF THE INVENTION

In quantitative analysis of pathological images, the quantification of features can be carried out on single cells before classifying them by classification algorithms. However, the cell shape on fluorescent images can have a jagged profile and the inside of cell body may not be homogenously filled, for example, as shown in FIGS. 1A and 1B.

Accurate cell body extraction can help quantify cell features for further pathological analysis, for example, analysis of cancer cells. However, the traditional morphological operations are generally not applicable to such cell images because they either merge separated cells or delete important cell regions during splitting of a cell.

SUMMARY OF THE INVENTION

In consideration of the above issues, it would be desirable to have a system and method, which helps accurately extract cell body regions.

In accordance with an exemplary embodiment, a method is disclosed of enhancing cell images for analysis, the method comprising: performing a multi-thresholding process on a cell image to generate a plurality of images of the cell image; smoothing each component within each of the plurality of images; merging the smoothed components into a merger layer according to a non-overlapping method; classifying each of the components of the merged layer into convex cell regions and concave cell regions; combining the concave cell regions with a cell boundary for each of the corresponding concave cell regions to generate a smoothed shape profile for each of the concave cell regions; and generating an output image by combining the convex cell regions with the concave cell regions with smoothed shape profiles.

In accordance with an exemplary embodiment, a non-transitory computer readable medium containing a computer program storing computer readable code is disclosed for enhancing cell images for analysis, the program being executable by a computer to cause the computer to perform a process comprising: performing a multi-thresholding process on a cell image to generate a plurality of images of the cell image; smoothing each component within each of the plurality of images; merging the smoothed components into a merger layer according to a non-overlapping method; classifying each of the components of the merged layer into convex cell regions and concave cell regions; combining the concave cell regions with a cell boundary for each of the corresponding concave cell regions to generate a smoothed shape profile for each of the concave cell regions; and generating an output image by combining the convex cell regions with the concave cell regions with smoothed shape profiles.

In accordance with an exemplary embodiment, a system is disclosed for cell enhancement, the system comprising: an input module configured to generate a cell image; and at least one module configured to enhance the cell image, the at least one module including a processor configured to: perform a multi-thresholding process on the cell image to generate a plurality of images of the cell image; smooth each component within each of the plurality of images; merge the smoothed components into a merger layer according to a non-overlapping method; classify each of the components of the merged layer into convex cell regions and concave cell regions; combine the concave cell regions with a cell boundary for each of the corresponding concave cell regions to generate a smoothed shape profile for each of the concave cell regions; and generate an output image by combining the convex cell regions with the concave cell regions with smoothed shape profiles.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Figure 1A:
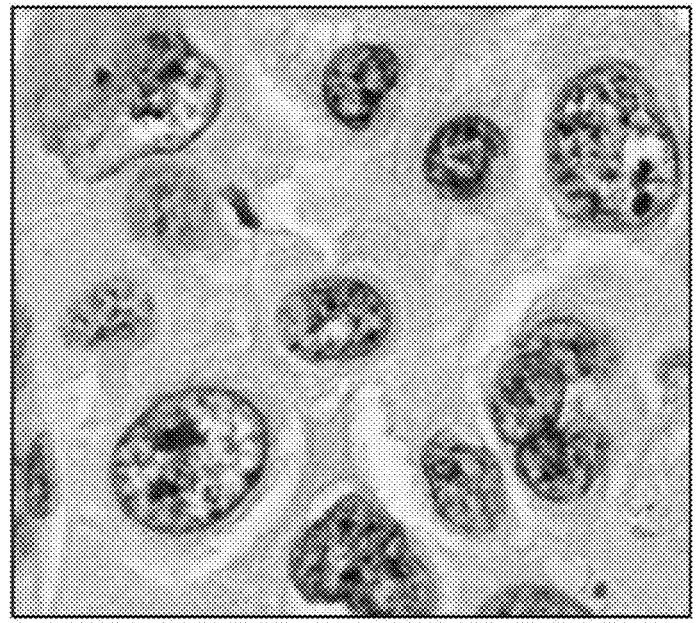
FIG. 1A is an illustration of pixels in the cell regions, which are not homogenously filled.

Reference will now be made in detail to the present preferred embodiments of the invention, examples of which are illustrated in the accompanying drawings. Wherever possible, the same reference numbers are used in the drawings and the description to refer to the same or like parts.

Figure 2A:
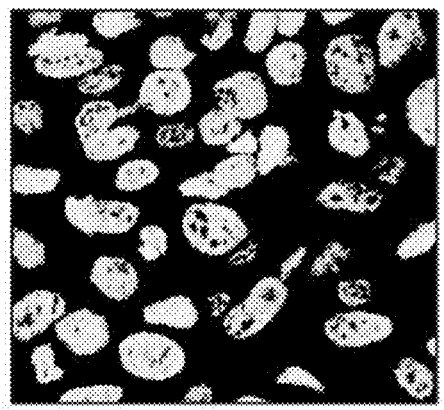
FIG. 2A is an illustration of a cell region image illustrating a map output from a machine learning program or algorithm.
Figure 2B:
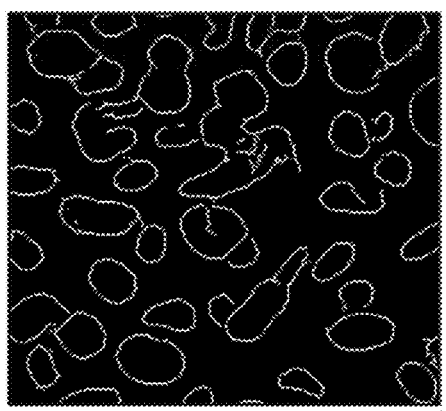
FIG. 2B is an illustration of a cell boundary from a boundary imaging process in accordance with an exemplary embodiment.

In accordance with an exemplary embodiment, the input image can be, for example, fluorescent images with background removed or an image output from a machine learning process or algorithm. In accordance with an exemplary embodiment, the regions can be defined exclusively by the intensity function in the region and the outer border as can be seen in FIG. 2A. In general, the image can contain cells with uncompleted boundaries and irregular holes, including boundaries and holes that are touching together. For example, it can be expected that an output image will be a cell image where the cells are separated from the background and the extracted cell shape shall be the same as the true shape in the original image. In accordance with an exemplary embodiment, in order to obtain the desired cell images, the method and system are disclosed, which includes smoothing cell boundaries, filling holes, recovering missing regions, and separating cells touching one another.

Figure 1B:
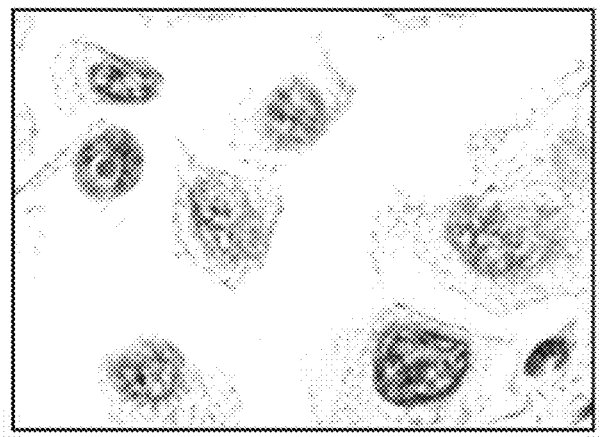
FIG. 1B is an illustration of cell boundaries, which are jagged, for example.
Figure 3:
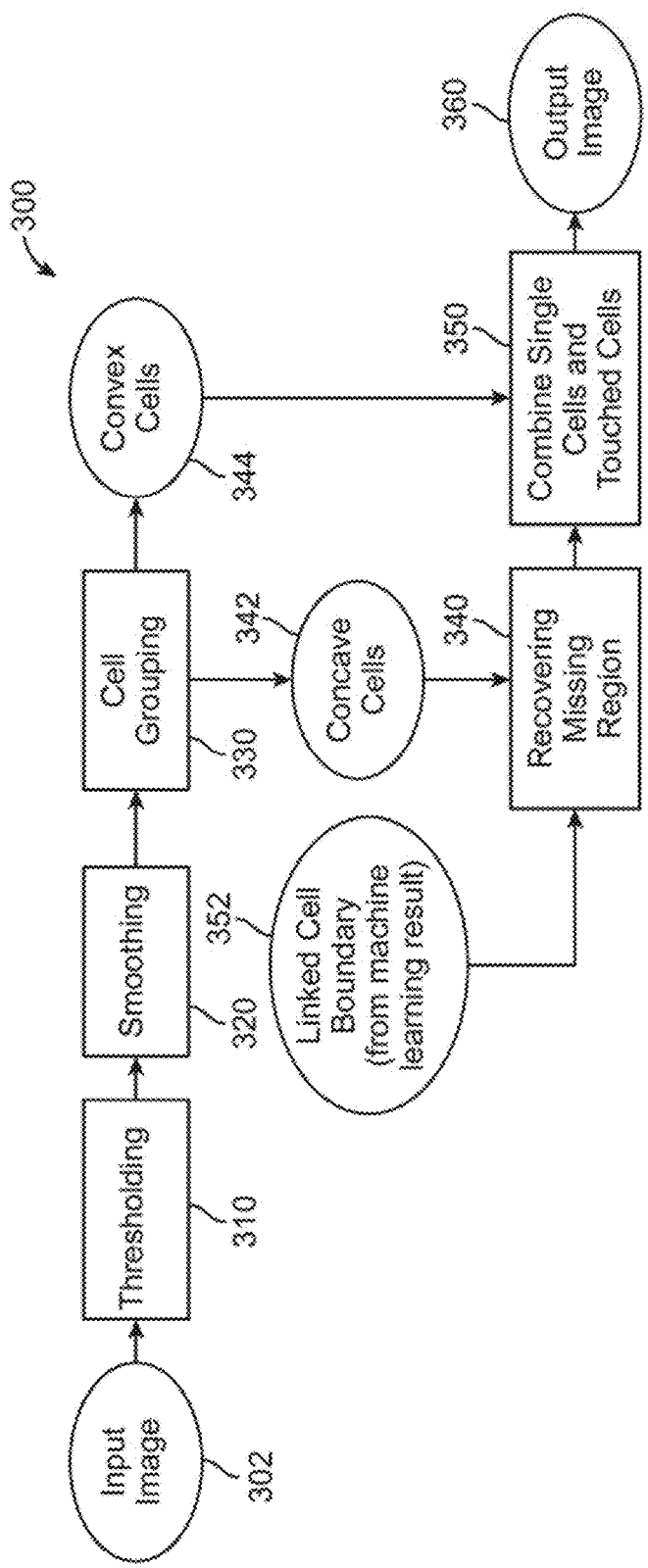
FIG. 3 is an illustration of a processing diagram in accordance with an exemplary embodiment.

In accordance with an exemplary embodiment, methods are disclosed, which can include the following modules 310, 320, 330, 340 as shown in FIG. 3. The modules can include a thresholding module 310, a smoothing module 320, a cell grouping module 330, and a recovering missing region module 340. The input image 302, for example, can be a fluorescent image with background removed or machine learning output from a cell image as depicted in FIGS. 1A and 1B.

In accordance with an exemplary embodiment, the thresholding module 310 performs a multi-level threshold method 400 (FIG. 4) on the input image 302. The output from the multi-level threshold method 400 is then fed into the smoothing module 320, which performs a cell smoothing process 600 (FIG. 6) on the cells from the output of the thresholding module 310.

The cell grouping module 330 then classifies the cells into concave cells 342 and convex cells 344. In accordance with an exemplary embodiment, the recovering missing region module 340 combines the concave cells 342 with linked cell boundaries produced by a machine learning module 352. The convex cells 344 are then combined 350 with concave cells with smoothed shape profiles from the recovering missing region module 340 to generate an output image 360.

In accordance with an exemplary embodiment, the thresholding module 310, the smoothing module 320, the cell grouping module 330, and the recovering missing region module 340 can include one or more computer or processing devices having a memory, a processor, an operating system and/or software and/or an optional graphical user interface (GUI) and/or display. In accordance with an exemplary embodiment, for example, each of the modules 310, 320, 330, 340 can be combined in one computer device, for example, a standalone computer, or can be contained within one or more computer devices, wherein each of the one or more computer devices has a memory, a processor, an operating system and/or software, and a graphical user interface (GUI) or display.

Thresholding

Figure 4:
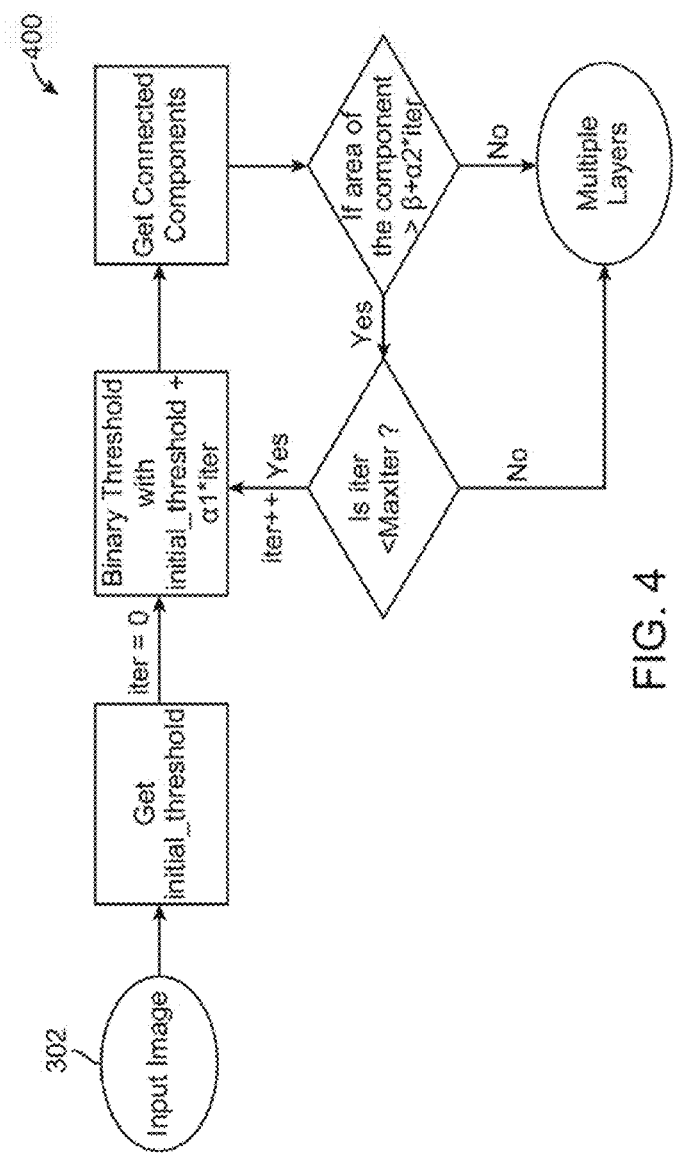
FIG. 4 is a diagram of a multi-level threshold diagram in accordance with an exemplary embodiment.

In an image that the regions are defined exclusively by the intensity function such as a likelihood image as shown in FIG. 2A, some false detected regions usually have low probability so that a thresholding operation can be performed to remove those false detections. Because it can difficult to determine a global threshold value for all cells in an image, a multi-level threshold method 400 as shown in FIG. 4 can be used, which can threshold an image 302, for example, multiple times, with a range of thresholds. In accordance with an exemplary embodiment, for example, the threshold value on large touching cell components can be maximized, while the small cell components can be preserved.

In accordance with an exemplary embodiment, in the thresholding process, the cells are grouped into different layers, and in each layer, each cell component is found. Thus, each cell component is processed separately. In accordance with an exemplary, the thresholding algorithm can be described as follows:
1. Get an initial threshold (T0) using Otsu's method;
2. iteration=0;
3. Get current threshold $T=T0+\alpha 1*iteration$;
4. Threshold the image by using the current threshold T;
5. Get all connected component;
6. For each component, if its size is less than $\beta+\alpha 2*iteration$, move it to a new image layer;
7. Iteration=Iteration+1; and
8. Repeat steps 3-7 until maximal iteration reached.

where $\beta$ is an initial size to divide the cell into different layers, $\alpha 1$, $\alpha 2$ represent the incremental step for each iteration. For example, in accordance with an exemplary embodiment, $\beta=1000$, $\alpha 1=20$, $\alpha 2=500$, and maximal iteration set to 6, for example.

Smoothing

Figure 5:
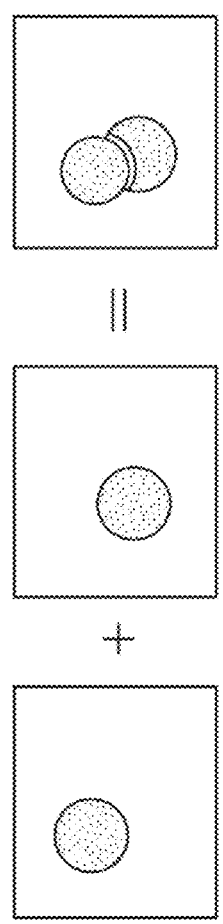
FIG. 5 is an illustration of merging two component diagrams in accordance with an exemplary embodiment.
Figure 6:
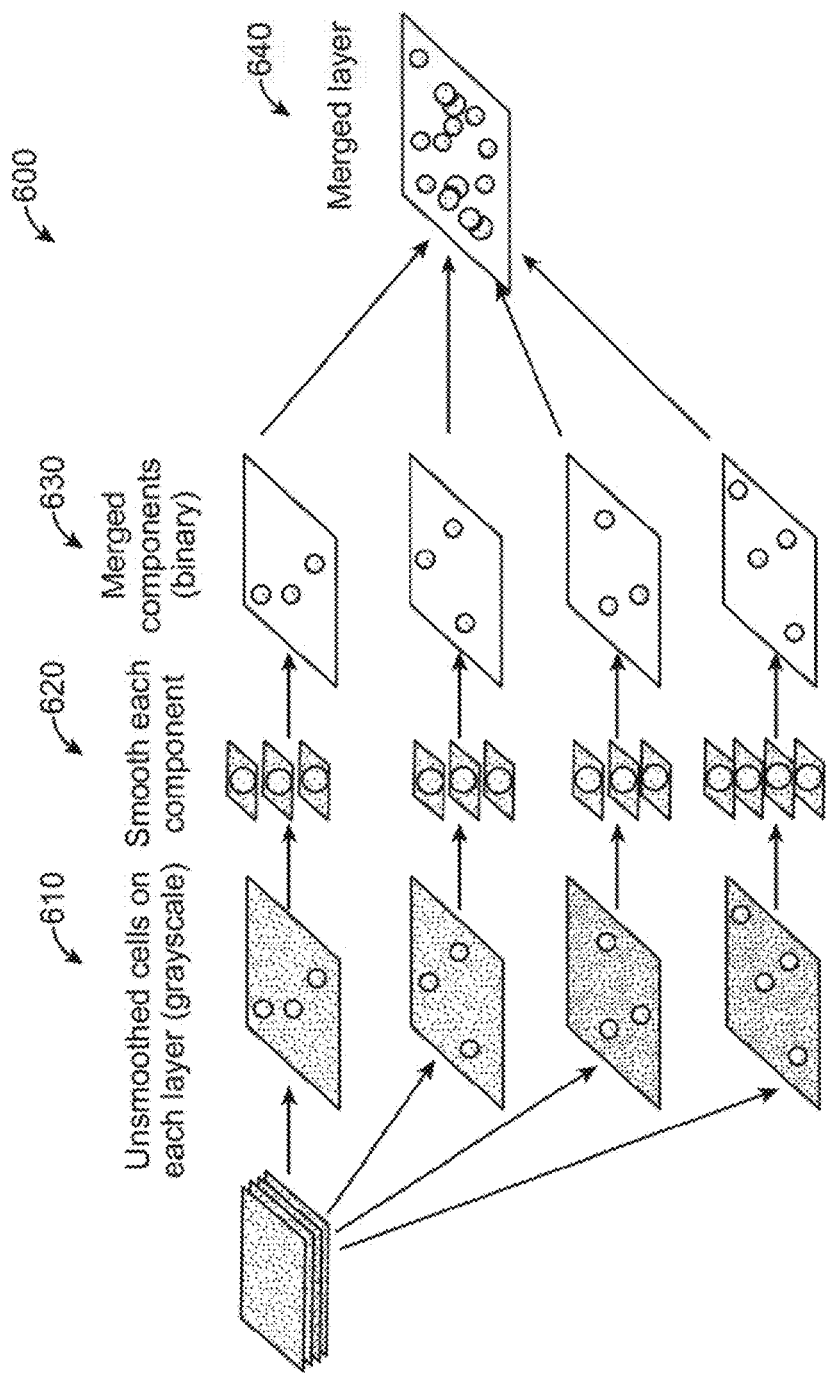
FIG. 6 is a diagram of a cell smoothing process in accordance with an exemplary embodiment.

FIG. 6 is a diagram of a cell smoothing process 600 in accordance with an exemplary embodiment. After obtaining multiple layers from the above module, in step 610 of FIG. 6, connected components analysis is conducted at each layer, and then in step 620, an imaging process algorithm, for example, a Gaussian Smoothing can be applied to smooth each component separately. After all the components are smoothed, in step 630, the individual connected components are merged at the same layer individually, (i.e., one by one) onto the same image. If a component overlaps another component during merging, the overlapped boundary will be marked as a separation line as illustrated in FIG. 5, which effectively avoids touching nearby cells. Finally, in step 640, the smoothed connected components at each layer can be combined onto a single image as shown in FIG. 5.

Cell Grouping

Figure 8B:
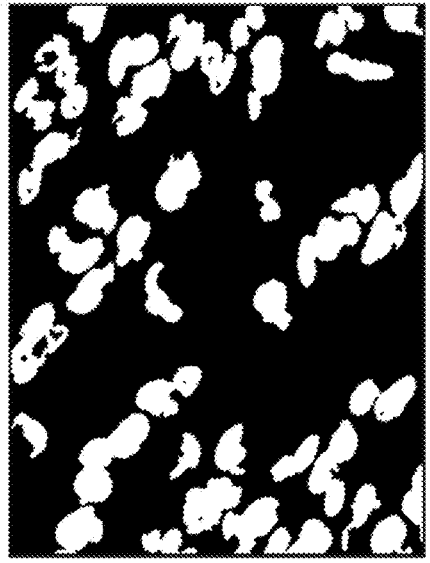
FIG. 8B illustrates concave cells in accordance with an exemplary embodiment.
Figure 8A:
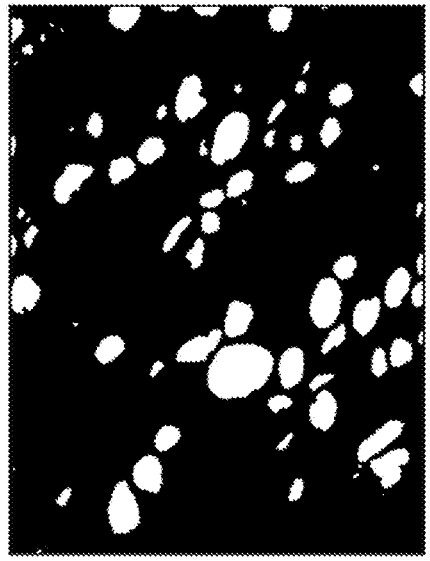
FIG. 8A illustrates convex cells in accordance with an exemplary embodiment.

In accordance with an exemplary embodiment, to avoid over-processing the single cells, all cells in an image after the smoothing processing can be classified into two categories: convex cell regions 344 and concave cell regions 342. FIGS. 8A and 8B are example of convex cells and concave cells, respectively. The regions with concavity may have some parts or regions missing. Thus, in accordance with an exemplary embodiment, a further process may be needed in order to recover the missing part as will be disclosed in the next section.

Figure 7:
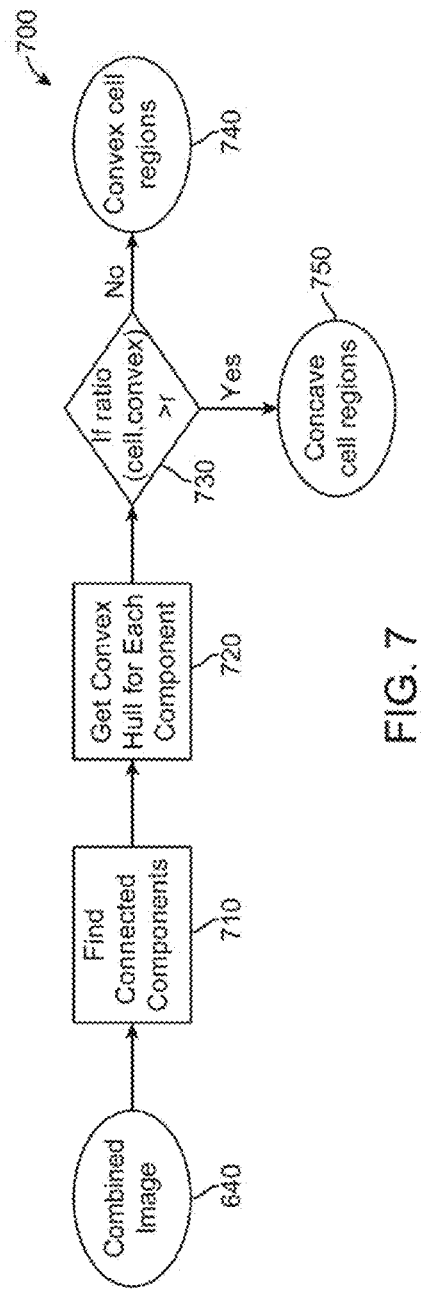
FIG. 7 is a diagram showing cell grouping in accordance with an exemplary embodiment.

FIG. 7 is a diagram illustrating cell grouping 700 in accordance with an exemplary embodiment. From the results obtained in the process as illustrated in FIG. 6, the combined image 640 is received and connected components are found in step 710. In step 720, convex hulls can be extracted for each connected component. For example, in accordance with an exemplary embodiment, in step 730, the following criterion can be used to determine convex cell regions 740 and concave cell regions 750:

$$R = \frac{\text{Area (convex hull)}}{\text{Area (cell)}}, \begin{cases} R < r, & \text{convex cell region} \\ R \geq r, & \text{concave cell region} \end{cases}$$

where r is a threshold indicating the degree of concavity. If R is large, for example, the component has more concavities. This also implies that the cell region is more likely missed, for example, r=2 can be used. Finally, the cells that are classified as convex cell regions are moved on to one buffer (image), while the cells that are classified as concave cell regions are moved on to another buffer (image).

Recovering Missing Region

Figure 9:
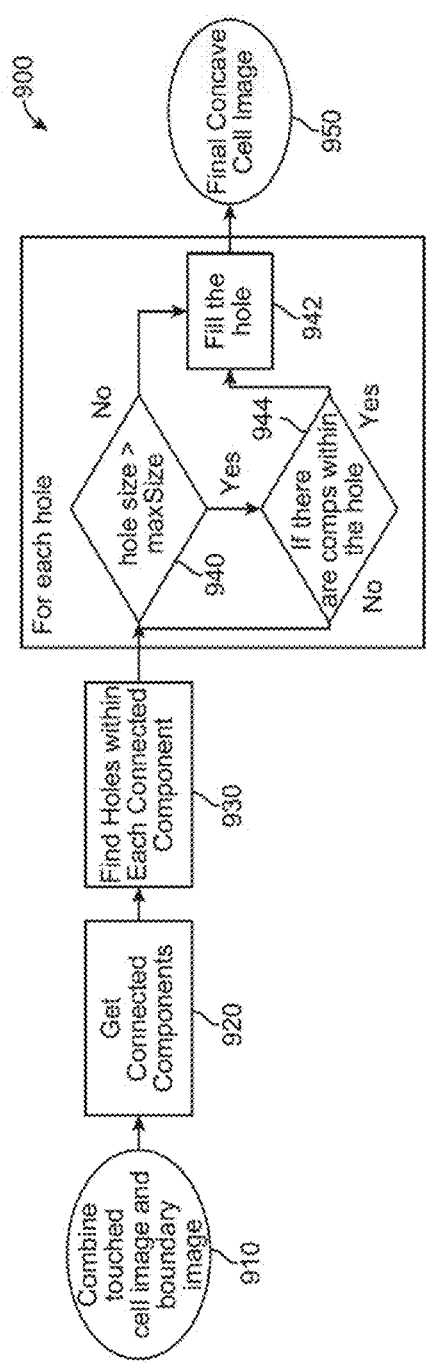
FIG. 9 is a diagram illustrating a process of recovering missing regions in accordance with an exemplary embodiment.

After the concave cell regions 750 are extracted, the cell boundaries are applied to overlays on these the concave cell regions and all the holes inside the region are found. FIG. 9 is the processing diagram 900 of recovering missing region module 340. As shown in FIG. 9, in step 910, the touched cells, which are those cells having concave cell regions and cell boundary overlays are combined to form touch cells (or touched cells). In step 920, connected components for the touch cells are obtained, and in step 930, holes are found within each connected component. In step 940, for each hole, a determination is made, if the hole size is greater than a predetermined size (or maximum size). In step 942, if the hole size is less than the predetermined size, the hole is filled. In step 944, if the hole size is greater than the predetermined size, a determination is made if there are components within the hole, if yes, the hole is filled in step 944, if no components in the hole, the process returns to step 940. Once the hole is filled, in step 950, a final concave cell image is provided.

Figure 10:
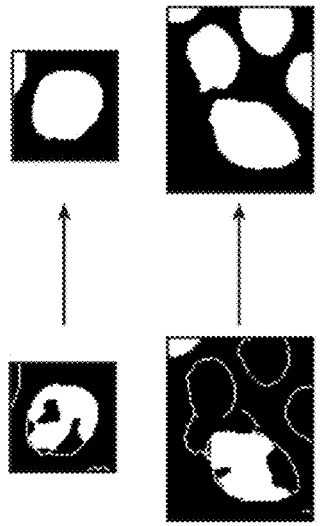
FIG. 10 illustrates a process of adding cell boundary to correct the cell shape in accordance with an exemplary embodiment.
Figure 11:
FIG. 11 illustrates a hole surrounded by separated cells (marked as a circle) that shall not be filled in accordance with an exemplary embodiment.
Figure 12:
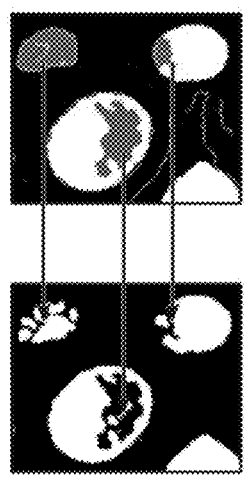
FIG. 12 illustrates a map showing cells having a hole (light gray area) onto the original image, and filling the hole if there are single components in the hole area.
Figure 12:
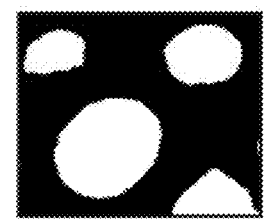

In accordance with an exemplary embodiment, since only the holes with a complete boundary can be filled, adding an edge can increase the chance to close the boundary, for example, as shown in FIG. 10. However, sometimes the space surrounded by separated cells can be filled as shown in FIG. 11. In order to avoid filling these spaces, in accordance with an exemplary embodiment, the hole is mapped to the original image and checked to determine if there are single components inside the hole. In accordance with an exemplary embodiment, the holes will be filled, for example, only when there are components inside the hole as shown in FIG. 12.

In accordance with an exemplary embodiment, a non-transitory computer readable medium containing a computer program storing computer readable code is disclosed for enhancing cell images for analysis, the program being executable by a computer to cause the computer to perform a process comprising: performing a multi-thresholding process on a cell image to generate a plurality of images of the cell image; smoothing each component within each of the plurality of cell images; merging the smoothed components into a merger layer; classifying each of the components of the merged layer into convex cell regions and concave cell regions; combining the concave cell regions with a cell boundary for each of the corresponding concave cell regions to generate a smoothed shape profile for each of the concave cell regions; and generating an output image by combining the convex cell regions with the concave cell regions with smoothed shape profile.

The computer readable recording medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of enhancing cell images for analysis, the method comprising:
    performing a multi-thresholding process on a cell image to generate a plurality of images of the cell image;
    smoothing each component within each of the plurality of images;
    merging the smoothed components into a merger layer;
    classifying each of the components of the merged layer into convex cell regions and concave cell regions;
    combining the concave cell regions with a cell boundary for each of the corresponding concave cell regions to generate a smoothed shape profile for each of the concave cell regions; and
    generating an output image by combining the convex cell regions with the concave cell regions with smoothed shape profiles.

2. The method according to claim 1, wherein the multi-thresholding process comprises:
    a. Get an initial threshold (T0) using Otsu's method;
    b. iteration=0;
    c. Get current threshold $T=T0+\alpha 1 *\text{iteration}$;
    d. Threshold the image by using the current threshold T;
    e. Get all connected components;
    f. For each component, if component size is less than $\beta+\alpha 2*\text{iteration}$, move the component to a new image layer;
    g. Iteration=Iteration+1; and
    h. Repeat steps c-g until maximal iteration reached
    where $\beta$ is an initial size to divide the cell into different layers, $\alpha 1$, $\alpha 2$ represent an incremental step for each iteration.

3. The method according to claim 2, wherein $\beta=1000$, $\alpha 1=20$, $\alpha 2=500$, and a maximal iteration is set to 6.

4. The method according to claim 1, wherein the smoothing of each component within each of the plurality of cell images comprises:
    applying a Gaussian Smoothing algorithm to each component.

5. The method according to claim 1, comprising:
    determining the convex cell regions and the concave cell regions based on the following:

$$R = \frac{\text{Area (convex hull)}}{\text{Area (cell)}}, \begin{cases} R < r, & \text{convex cell region} \\ R \geq r, & \text{concave cell region} \end{cases}$$

wherein r is a threshold indicating a degree of concavity.

6. The method according to claim 1, comprising:
    adding an edge to those concave cell regions having a hole and mapping the hole onto the cell image; and filling only those holes in which a single component is inside the hole.

7. A non-transitory computer readable medium containing a computer program storing computer readable code for enhancing cell images for analysis, the program being executable by a computer to cause the computer to perform a process comprising:
performing a multi-thresholding process on a cell image to generate a plurality of images of the cell image;
smoothing each component within each of the plurality of images;
merging the smoothed components into a merger layer;
classifying each of the components of the merged layer into convex cell regions and concave cell regions;
combining the concave cell regions with a cell boundary for each of the corresponding concave cell regions to generate a smoothed shape profiles for each of the concave cell regions; and
generating an output image by combining the convex cell regions with the concave cell regions with smoothed shape profiles.

8. The non-transitory computer readable medium according to claim 7, wherein the multi-thresholding process comprises:
a. Get an initial threshold (T0) using Otsu's method;
b. iteration=0;
c. Get current threshold T=T0+α1*iteration;
d. Threshold the image by using the current threshold T;
e. Get all connected components;
f. For each component, if component size is less than β+α2*iteration, move the component to a new image layer;
g. Iteration=Iteration+1; and
h. Repeat steps c-g until maximal iteration reached
where β is an initial size to divide the cell into different layers, α1, α2 represent an increasing speed for each iteration.

9. The non-transitory computer readable medium according to claim 7, wherein β=1000, α1=20, α2=500, and a maximal iteration is set to 6.

10. The non-transitory computer readable medium according to claim 7, wherein the smoothing of each component within each of the plurality of cell images comprises:
applying a Gaussian Smoothing algorithm to each component.

11. The non-transitory computer readable medium according to claim 7, comprising:
determining the convex cell regions and the concave cell regions based on the following:

$$R = \frac{\text{Area (convex hull)}}{\text{Area (cell)}}, \begin{cases} R < r, & \text{convex cell region} \\ R \geq r, & \text{concave cell region} \end{cases}$$

wherein r is a threshold indicating a degree of concavity.

12. The non-transitory computer readable medium according to claim 7, comprising:
adding an edge to those concave cell regions having a hole and mapping the hole onto the cell image; and
filling only those holes in which a single component is inside the hole.

13. A system for cell enhancement, the system comprising:
an input module configured to generate cell images; and
at least one module configured to enhance the cell image, the at least one module including a processor configured to:
perform a multi-thresholding process on the cell image to generate a plurality of images of the cell image;
smooth each component within each of the plurality of images;
merge the smoothed components into a merged layer;
classify each of the components of the merged layer into convex cell regions and concave cell regions;
combine the concave cell regions with a cell boundary for each of the corresponding concave cell regions to generate a smoothed shape profile for each of the concave cell regions; and
generate an output image by combining the convex cell regions with the concave cell regions with smoothed shape profiles.

14. The system according to claim 13, wherein the multi-thresholding process comprises:
a. Get an initial threshold (T0) using Otsu's method;
b. iteration=0;
c. Get current threshold T=T0+α1*iteration;
d. Threshold the image by using the current threshold T;
e. Get all connected components;
f. For each component, if component size is less than β+α2*iteration, move the component to a new image layer;
g. Iteration=Iteration+1; and
h. Repeat steps c-g until maximal iteration reached
where β is an initial size to divide the cell into different layers, α1, α2 represent an increasing speed for each iteration.

15. The system according to claim 14, wherein β=1000, α1=20, α2=500, and a maximal iteration is set to 6.

16. The system according to claim 13, wherein the smoothing of each component within each of the plurality of cell images comprises:
applying a Gaussian Smoothing algorithm to each component.

17. The system according to claim 13, comprising:
determining the convex cell regions and the concave cell regions based on the following:

$$R = \frac{\text{Area (convex hull)}}{\text{Area (cell)}}, \begin{cases} R < r, & \text{convex cell region} \\ R \geq r, & \text{concave cell region} \end{cases}$$

wherein r is a threshold indicating a degree of concavity.

18. The system according to claim 13, wherein the processor is configured to:
add an edge to those concave cell regions having a hole and mapping the hole onto the cell image; and
fill only those holes in which a single component is inside the hole.

19. The system according to claim 13, comprising:
a display for displaying the output image.

* * * * *